United States Patent [19]

Yoshida

[11] Patent Number: 4,839,740

[45] Date of Patent: Jun. 13, 1989

[54] IMAGE PROCESSING APPARATUS FOR DETERMINING THE PRESENCE OR ABSENCE OF AN IMAGE ON EACH SIDE OF A PLURALITY OF ORIGINALS PRIOR TO PRODUCING TWO-SIDED COPIES OF THE ORIGINALS TO AVOID PRODUCING ANY COPIES WITH BLANK SIDES

[75] Inventor: Eiichi Yoshida, Kawasaki, Japan

[73] Assignee: Canon Kabushiki Kaisha, Tokyo, Japan

[21] Appl. No.: 847,299

[22] Filed: Apr. 2, 1986

[30] Foreign Application Priority Data

Apr. 4, 1985 [JP] Japan .................................. 60-69985
Apr. 4, 1985 [JP] Japan .................................. 60-69986

[51] Int. Cl.[4] .................. H04N 1/17; H04N 1/04; H04N 1/40; G03B 27/46
[52] U.S. Cl. .................................... 358/288; 358/280; 358/285; 358/293; 355/24
[58] Field of Search ............... 358/280, 282, 288, 285, 358/293; 355/23, 24, 25

[56] References Cited

U.S. PATENT DOCUMENTS

| 4,218,128 | 8/1980 | Satomi et al. | 355/24 |
| 4,708,462 | 11/1987 | Stemmle | 355/24 |
| 4,721,381 | 1/1988 | Matsuo | 355/24 |

FOREIGN PATENT DOCUMENTS

| 3413651 | 10/1984 | Fed. Rep. of Germany | 358/282 |
| 57-80865 | 5/1982 | Japan | 358/288 |
| 57-171350 | 10/1982 | Japan | 355/23 |
| 58-225776 | 12/1983 | Japan | 358/288 |
| 59-122075 | 7/1984 | Japan | 358/282 |
| 60-3264 | 1/1985 | Japan | 358/288 |
| 60-197062 | 10/1985 | Japan | 358/288 |
| 60-235571 | 11/1985 | Japan | 358/288 |
| 60-235573 | 11/1985 | Japan | 358/288 |
| 60-235574 | 11/1985 | Japan | 358/288 |

Primary Examiner—James J. Groody
Assistant Examiner—Randall S. Svihla
Attorney, Agent, or Firm—Fitzpatrick, Cella, Harper & Scinto

[57] ABSTRACT

An image processing apparatus has an automatic document feeder for feeding one- and/or two-sided orginals, an image reader such as a CCD for reading images on the originals, an image determining unit for determining the presence or absence of an image on an original, a convey control unit for controlling convey of originals and recording media in accordance with the determination result of the image determining unit, a two-sided copy unit for producing two-sided copies and a sorter for storing the copies. Images of originals including one- and two-sided originals can be reproduced sequentially on both sides of recording media, without omitting an image on either side in accordance with determination results from the image determining unit. The image determining unit can determine the presence or absence of an image on one or more originals while the original is located at a reading position and prior to a copy being produced thereof.

19 Claims, 13 Drawing Sheets

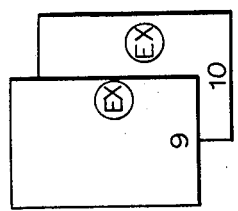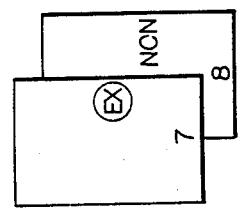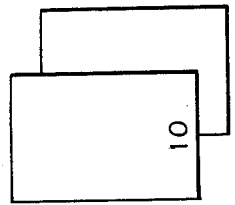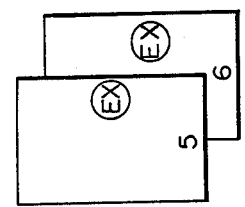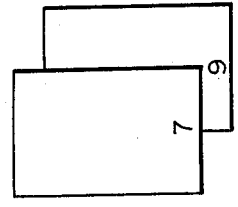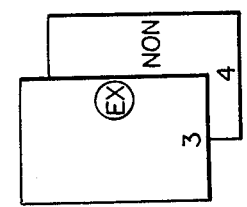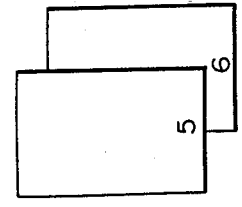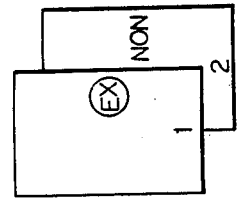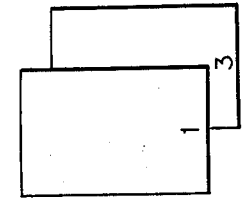
Fig. 9(a)  Fig. 9(b)

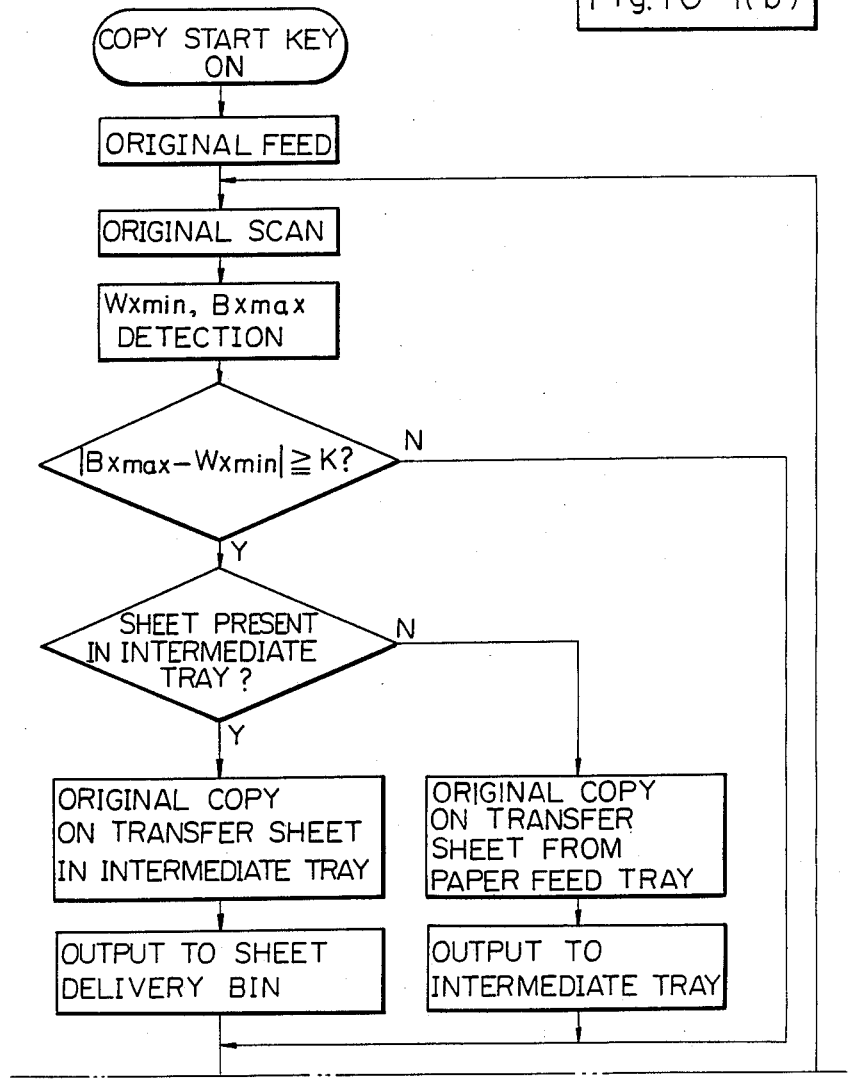

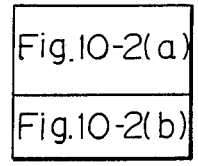
Fig. 10-2(a)
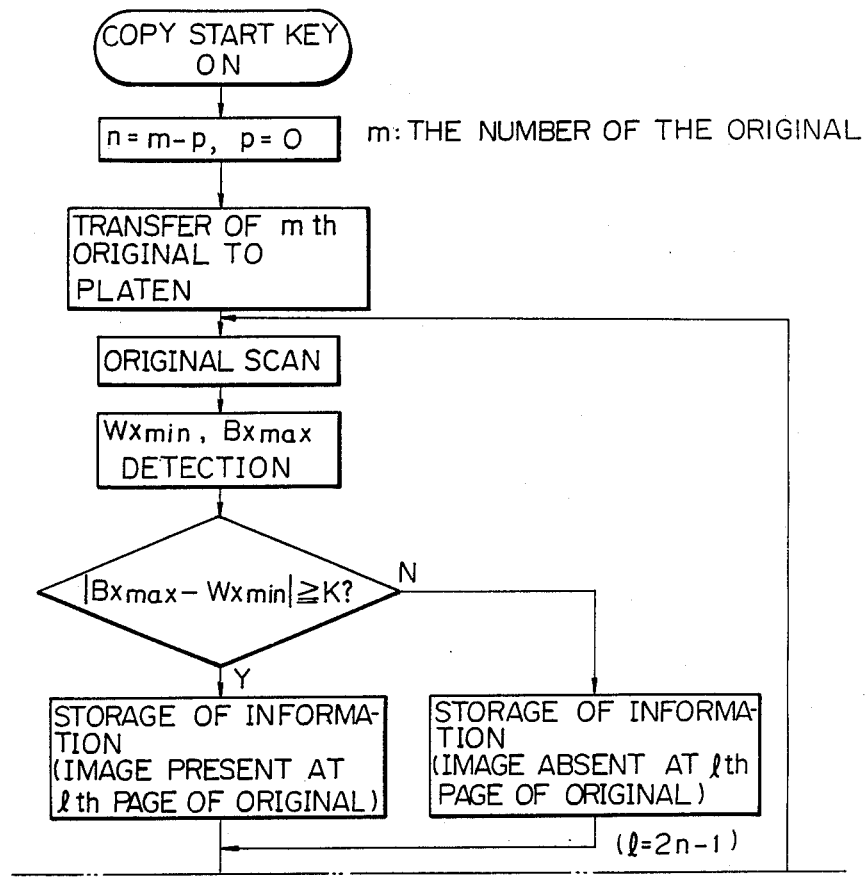

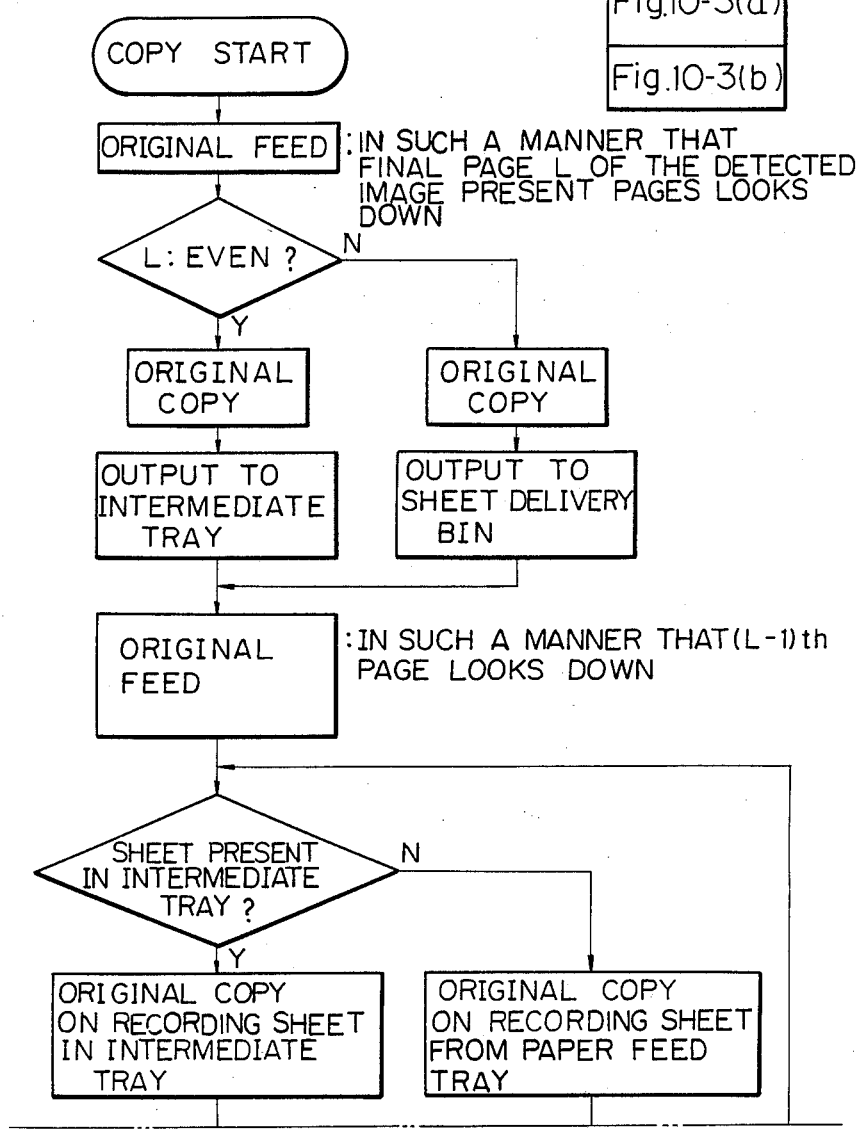

IMAGE PROCESSING APPARATUS FOR DETERMINING THE PRESENCE OR ABSENCE OF AN IMAGE ON EACH SIDE OF A PLURALITY OF ORIGINALS PRIOR TO PRODUCING TWO-SIDED COPIES OF THE ORIGINALS TO AVOID PRODUCING ANY COPIES WITH BLANK SIDES

BACKGROUND OF THE INVENTION

1. Field of the Invention

The present invention relates to an apparatus for processing an image.

2. Related Background Art

In a conventional apparatus of this type, an automatic document feeder and a two-side unit are built into an analog copying machine. An operator designates a desired copy mode (e.g., one- or two-side copy mode) at an operation unit and depresses a copy key. An original is fed from the automatic document feeder into a platen, and an image or images are formed on one or two sides of a fed recording medium according to known electrophotographic techniques.

However, if one- and two-side originals are mixed, two-sided copies cannot be continuously output, since copying is performed faithfully according to the originals.

In order to solve this problem, reading of original images is programmed to form desired copies. Not only is such a program complicated, however, but should it contain any errors, desired images cannot be obtained. In addition, unnecessary blank sheets are often mixed in with the copied sheets, thus creating handling problems.

SUMMARY OF THE INVENTION

It is an object of the present invention to provide an improved image processing apparatus which removes the conventional drawbacks.

It is another object of the present invention to provide an image processing apparatus which determines the presence or absence of an image on an original and controls image processing according to a determination result.

It is still another object of the present invention to provide an image processing apparatus which processes images without page omissions even if two-side and one-side originals are mixed.

It is still another object of the present invention to provide an image processing apparatus which processes images on continuous pages at high speed.

It is still another object of the present invention to provide an image processing apparatus which maximizes the advantages of digital image reading.

The above and other objects, features and advantages of the present invention will be apparent from the following detailed description in conjunction with the accompanying drawings.

BRIEF DESCRIPTION OF THE DRAWINGS

FIGS. 9(a) and 9(b) are representations for explaining stacking states of originals and the page order of recording sheets;

FIGS. 10-1(a) and 10-1(b) represent a flow chart for determining the presence/absence of an image when an original is fed for exposure and these FIGS. are represented together as FIG. 10-1;

FIGS. 10-2(a) and 10-2(b) represent a flow chart for explaining processing as image determination for all originals prior to copying and these FIGS. are represented together as FIG. 10-2; and FIGS. 10-3(a) and 10-3(b) represent a flow chart for explaining postprocessing after the original image presence/absence determination and these FIGS. are represented together as FIG. 10-3.

DETAILED DESCRIPTION OF THE PREFERRED EMBODIMENTS

Figure 1:
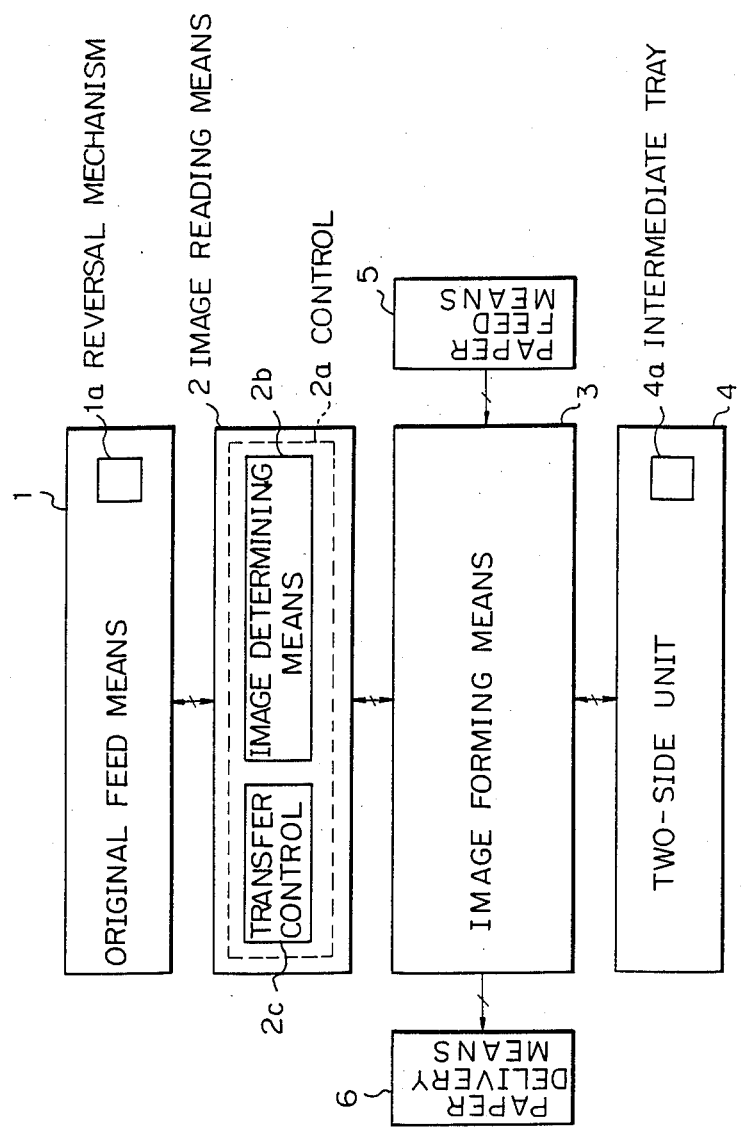
FIG. 1 is a block diagram of a two-side image processing apparatus according to the present invention.

FIG. 1 is a block diagram of a two-side image processing apparatus according to an embodiment of the present invention. The apparatus includes an original feed means 1 which has a reversal mechanism 1a for reversing an original. The original feed means 1 sequentially feeds originals onto the platen. After image reading is completed, the original is delivered to a predetermined position. An image reading means 2 optically scans an original placed on the platen and causes an image pickup device (e.g., a CCD) to convert the optical signal into an electrical signal. In other words, the optical signal from a scanner (not shown) in an image forming means 3 is modulated to an electrical signal. The image reading means 2 also includes a control 2a for controlling the constituent components. The control 2a communicates with the components through the corresponding interfaces via a cable (not shown), and performs real-time processing. An image determinating means 2b and a transfer control 2c are arranged in the control 2a. The image determining means 2b reads one- and two-side originals fed by the original feed means 1, determines the presence or absence of an image, and supplies a parallel instruction to the original feed means 1, the image forming means 3 and a two-side unit 4 in accordance with the determination result. The parallel instruction controls sequential feed of originals and recording media. The two-side unit 4 selectively reverses recording media (to be referred to as sheets hereinafter) having images formed by the image forming means 3. The selected copied sheets are fed again to the image forming means 3. An intermediate tray 4a is arranged in the two-side unit 4 to temporarily stop the fed sheets. The image processing apparatus also includes a paper feed means 5 consisting of paper cassettes (including a manual feed tray) for all paper sizes and a paper deck for storing a large number of sheets. A paper delivery means 6 includes a sorter and a delivery tray for properly sorting and stacking the two-side or one-side copies. The image forming means 3 transfers images onto sheets in response to electrical signals from the image reading means 2 in accordance with known electrophotographic techniques. An operation unit is arranged in the image reading means 2 to allow an operator to set a desired image forming mode.

The operation of the image processing apparatus having the above arrangement will be described hereinafter.

After the operator sets an original at a predetermined position on the original feed means 1, he sets a one-side copy mode at the operation unit and depresses a copy key (not shown). The original is fed by the original feed means 1 to a predetermined position on the platen in the image reading means 2. The control 2 outputs an instruction for feeding a sheet from the paper feed means 5 to the aligning position of the image forming means 3. When the sheet stops at the aligning position, image reading of the original is started. An image signal modulated to an electrical signal drives an optical signal generator, e.g., a laser in the image forming means 3. A photosensitive body is scanned by a scanner (not shown) with a laser beam. A latent image is formed on the photosensitive body, and is developed and fixed by known techniques. The sheet with the fixed image is delivered to the paper delivery means 6. When a one-side original is to be copied, the original at the predetermined position is exhausted by the original feed means 1, and the next original is then fed to the predetermined position. However, when a two-side original is to be copied, the sheet already containing a copied image on one side thereof is reversed by the reversal mechanism 1a. The reversed sheet is then fed to the platen, and the same image forming process is performed again.

However, after the operator sets the original at the predetermined position on the original feed means 1, selects the two-side copy mode and depresses the copy key (not shown), the original is accurately fed by the original feed means 1 to the predetermined position on the platen of the image reading means 2. The image reading means 2 performs original scanning to determine if an image is present. If the image determining means 2b determines that "an image is present" in response to an image signal derived from this scanning, the control 2a outputs an instruction for causing the paper feed means 5 to feed the sheet to the aligning position of the image forming means 3. When the sheet is stopped at the aligning position, image reading is restarted. The image signal modulated to the electrical signal drives the optical signal generator such as a laser, and the photosensitive body is scanned with a laser beam by the scanner (not shown). A latent image is formed on the photosensitive body. The image is developed and fixed by known techniques. The sheet with images on both surfaces is delivered to the intermediate tray 4a of the two-side unit 4. Subsequently, the original placed on the platen is reversed by the reversal mechanism 1a of the original feed means 1 and accurately positioned on the platen. The same scanning operation as described above is performed. When the image determining means 2b checks for the presence or absence of an image on the original and determines that no image is present, the control 2a outputs an original exhaust instruction to the original feed means 1. In response to this instruction, the original feed means 1 exhausts the designated original. The next original is then fed by the original feed means 1 to the platen and is scanned. If the image determining means 2b determines that an image is present the transfer control 2c instructs feeding of the sheet in the intermediate tray 4a. When this sheet reaches the aligning position, the image forming process described above is repeated. The two-sided copy is exhausted in the paper delivery means, and the apparatus prepares for the next image formation. The above operation is repeated until copying of all originals placed on the original feed means 1 is completed.

The determination of image presence or absence by the image determining means 2b of FIG. 1 will be described with reference to FIGS. 2, 3, 4(a) to 4(c), 5(a) to 5(c), and 6(a) to 6(c).

Figure 2:
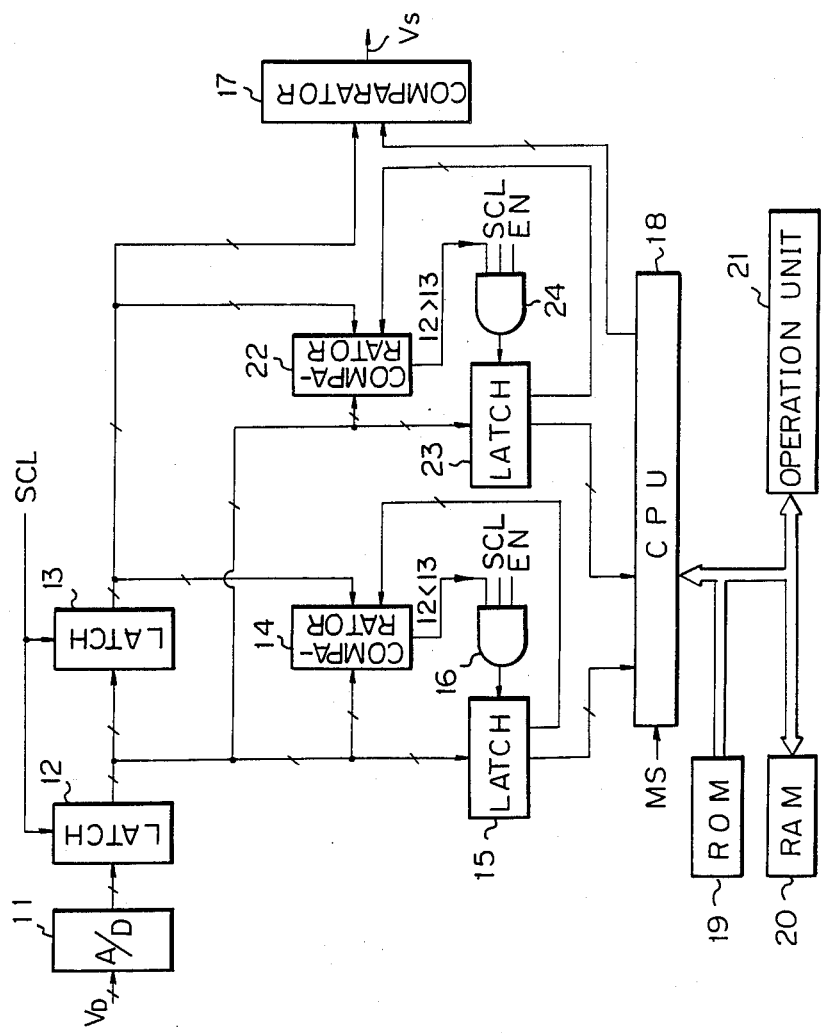
FIG. 2 is a block diagram of an image determining means shown in FIG. 1.

FIG. 2 is a block diagram of the image determining means 2b of FIG. 1, and the arrangement and operation thereof will be described below.

An image signal VD read by the image pickup device is converted by an A/D converter 11 into a 6-bit digital signal. The digital signal is supplied through a latch 12 to a latch 13, a comparator 14, and a latch 15 in response to a sampling clock SCL. The comparator 14 compares the 6-bit image signal from the latch 12 with the immediately preceding 6-bit image signal from the latch 13. If the level of the new image signal from the latch 12 is determined to be smaller than that of the immediately preceding image signal from the latch 13, the comparator 14 supplies a comparison output to an AND gate 16. The AND gate 16 supplies the comparison output from the comparator 14 to the latch 15 in response to the sampling clock SCL. Upon reception of the comparison output, the latch 15 supplies the image signal of the latch 12 to a CPU 18.

The image signal from the latch 15 is also fed back to the comparator 14 and is compared with the immediately succeeding image signal. If the immediately succeeding image signal is smaller than the feedback image signal, the value of the latch 15 is updated. Otherwise, the previous signals value is kept unchanged in the latch 15.

The AND gate 16 also receives an enable signal EN in addition to the comparison output and the sampling clock SCL. The enable signal EN represents the effective duration of the image signal from the image pickup device. The AND gate 16 supplies the comparison result of the image signal for the predetermined duration for each main scanning line from the latch 15 to the CPU 18. The CPU 18 fetches the image signal from the latch 15 in response to a main scanning line sync signal MS and detects the lowest density level of each main scanning line, i.e., the background level. Similarly, a comparator 22 compares the image signal from the latch 12 with that from the latch 13. If the level of the new image signal from the latch 12 is determined to be larger than that from the latch 13, the comparator 22 supplies a comparison output to an AND gate 24. The AND gate 24 supplies the comparison output to a latch 23 in response to the sampling clock SCL. Upon reception of the comparison output from the comparator 22, the latch 23 supplies the image signal of the latch 12 to the CPU 18. The image signal of the latch 23 is also fed back to the comparator 22 and is compared with the immediately succeeding image signal. If the immediately succeeding image signal is determined to be larger than that of the feedback image signal, the value of the latch 23 is updated to the value of the immediately succeeding image signal. Otherwise, the latch 23 keeps its previous value. The AND gate 24 also receives the enable signal EN in addition to the comparison output and the sampling clock SCL. The enable signal EN represents the effective duration of the image signal from the image pickup device, as described above. The result of comparing the image signal of the predetermined duration of each main scanning line is supplied from the latch 23 to the CPU 18. The CPU 18 fetches the image signal from the latch 23 in response to the main scanning line sync signal MS and detects the highest density level of each main scanning line, i.e., the image level. A ROM 19 comprises a mask ROM for storing control programs. A RAM 20 serves as a working memory. An operation unit 21 is used to set a desired mode.

The CPU 18 determines a threshold value for each main scanning line according to the detected background and image levels. The threshold value is supplied to a comparator 17 in response to the main scanning line sync signal MS. The comparator 17 compares the image signal from the latch 13 with the threshold value from the CPU 18 and generates a binary signal Vs. The level of each pixel in the A/D converted signal is given as $3F_{HEX}$ for the darkest pixel and $0_{HEX}$ for the lightest pixel, since the image signal consists of 6 bits. The threshold value and the background level of each main scanning line thus fall within the range of 0 to $3F_{HEX}$.

When the surface of an original cover (not shown) at the platen side is blackened or mirror-polished, the portion of the image signal corresponding to the original cover, as opposed to the original itself, represents a black signal, and is not detected as a background level. In this case, the enable signal EN can be equal to the maximum distance of the main scanning amplitude. If this non-original portion is likely to be detected to be white by the original feed means 1 or the like due to the presence of a conveyor belt or the like, the amplitude of the enable signal EN is limited to that for the minimum paper size.

Figure 3:
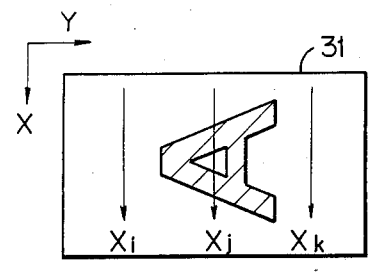
FIG. 3 is a plan view for explaining image presence/absence determination by the image determining means of FIG. 1.

FIG. 3 is a plan view for explaining determination of image presence or absence by the image determinating means 2b of FIG. 1. A direction X represents the main scanning direction of an original 31, and a direction Y represents the subscanning direction. Reference symbols Xi, Xj, and Xk denote main scanning lines.

Figure 4A:
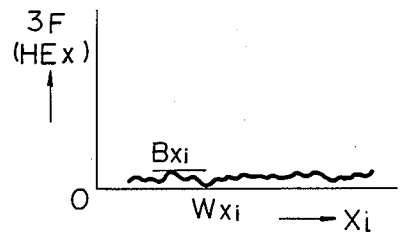
FIGS. 4(a) to 4(c) are charts for explaining the density balance of scanning lines.
Figure 4B:
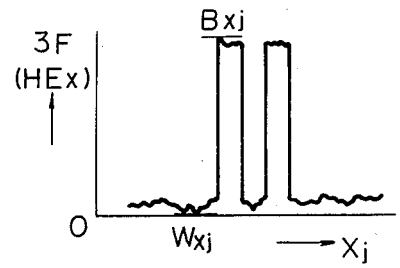
Figure 4C:
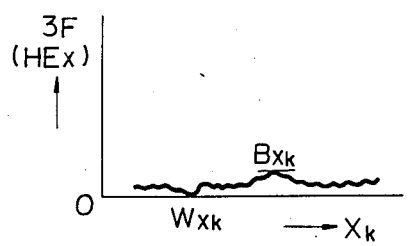

FIGS. 4(a) to 4(c) show waveforms of the density balances of the scanning lines Xi, Xj, and Xk. The density level is plotted along the ordinate, and the scanning lines are plotted along the abscissa.

Figure 5A:
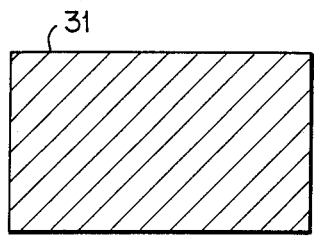
FIGS. 5(a) to 5(c) are plan views for explaining various original states.
Figure 5B:
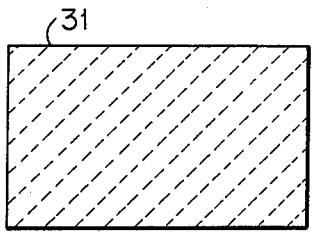
Figure 5C:
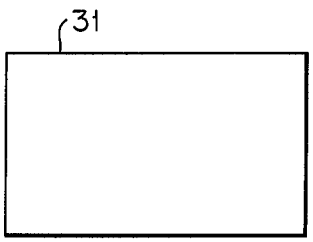

FIGS. 5(a) to 5(c) are plan views of originals 31. FIG. 5(a) shows a black original 31, FIG. 5(b) shows a color original 31, and FIG. 5(c) shows a white original 31.

Figure 6A:
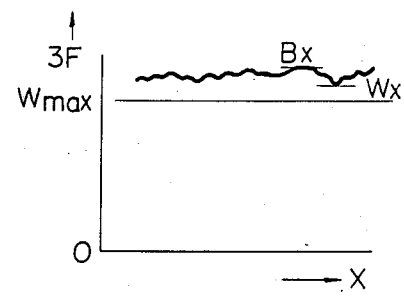
FIGS. 6(a) to 6(c) are charts for explaining density balances of the originals in FIGS. 5(a) to 5(c), respectively.
Figure 6B:
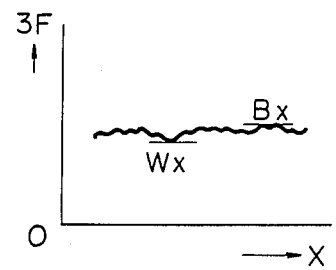
Figure 6C:
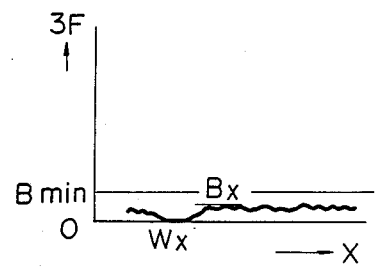

FIGS. 6(a) to 6(c) show waveforms for explaining the density balances of the originals 31 in FIGS. 5(a) to 5(c).

As shown in FIG. 3, assume that an original having a white background with a black letter "A" is scanned along the X direction (i.e., the main scanning direction) and the Y direction (i.e., the subscanning direction).

Given that an image signal of any main scanning line Xi, i.e., the image signal from the A/D converter 11, is as shown in FIG. 4(a), the output from the latch 15 is Wxi, and the output from the latch 23 is Bxi. These outputs are fetched by the CPU 18. Similarly, the image signals obtained by the main scanning lines Xj and Xk are shown in FIGS. 4(b) and 4(c), respectively. Outputs from the latch 15 are Wxj and Wxk, and outputs from the latch 23 are Bxj and Bxk. These outputs are also fetched by the CPU 18. The CPU 18 compares the sequential outputs Wx from the latch 15 with the corresponding outputs Bx from the latch 23 and detects a minimum value Wxmin of the outputs Wx and a maximum value Bxmax of the outputs Bx. The absolute value of the difference between these values, i.e., |Bxmax - Wxmin| is compared with a preset constant K as follows:

$$|Bxmax - Wxmin| \geq K \quad (1)$$

If inequality (1) is satisfied, the CPU 18 determines that an "image is present" on the original 31. However, if inequality (2) is satisfied:

$$|Bxmax - Wxmin| < K \quad (2)$$

the CPU 18 determines that "no image is present" on the original 31.

The output of the A/D converter 11 at an optional main scanning line in case of scanning the entirely black original of FIG. 5(a) is given in FIG. 6(a), and the output of the A/D converter 11 at an optional main scanning line in case of scanning the entirely white original of FIG. 5(c) is given in FIG. 6(c). According to the conventional method, if a color original is used, the density level of FIG. 6(b) depends on the color sensitivity of the image pickup device. In this case, since the finally detected Bxmax and Wxmin are at intermediate levels, the color image cannot even be detected as an "abnormal image". However, according to this embodiment, inequality (1) is used as a reference for determining the presence or absence of an image. Therefore, the presence or absence of an image can be accurately determined for all of the originals in FIGS. 5(a) to 5(c).

The operation of the transfer control 2c shown in FIG. 1 will be described with reference to FIG. 7.

Figure 7:
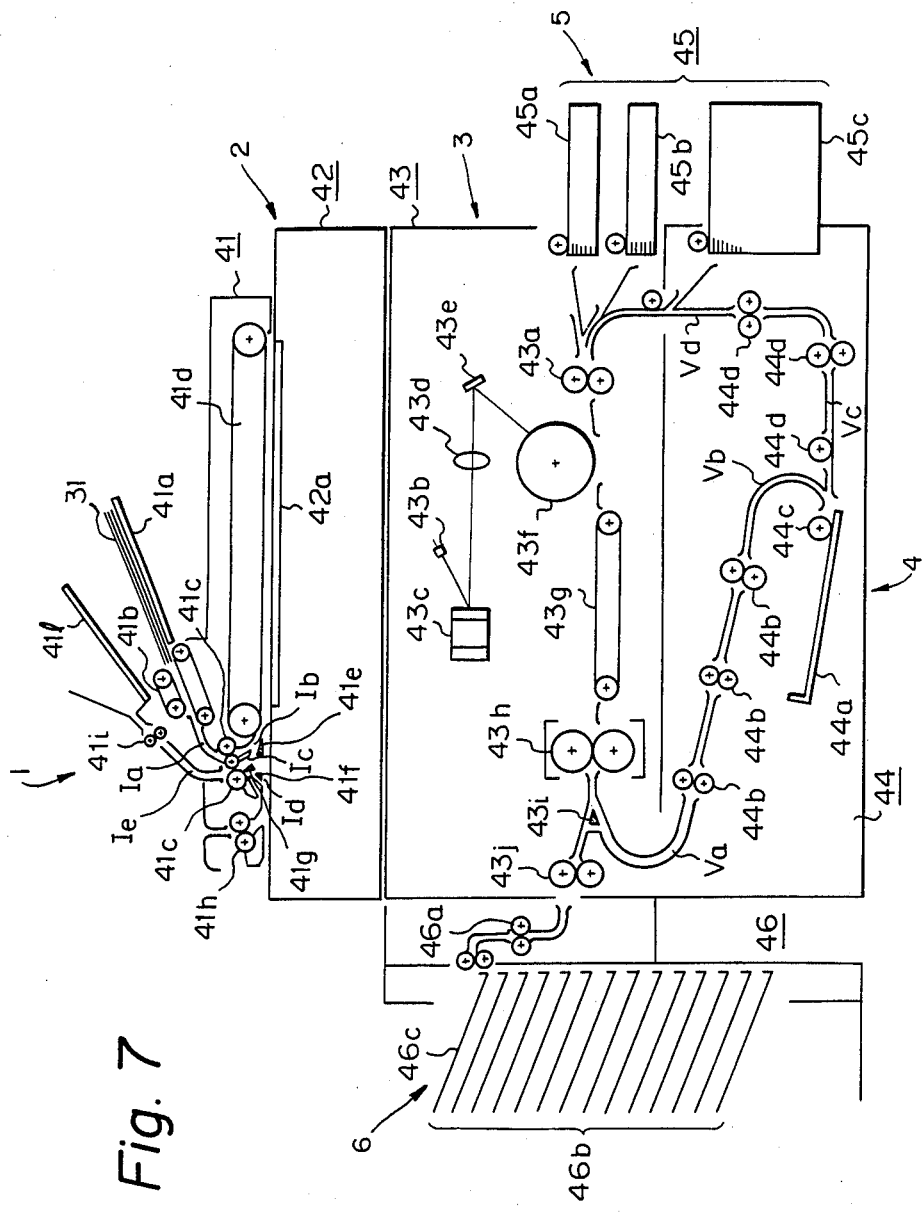
FIG. 7 and 8 are sectional views of two-sided copying machines as the two-side image processing apparatuses according to embodiments of the present invention.

FIG. 7 is a sectional view of a two-sided copying machine as in the present image processing apparatus. The copying machine includes a recirculating document feeder (RDF) 41, an image reading unit 42, an image forming unit 43, a two-side unit 44, a paper cassette/deck unit 45, and a paper delivery unit 46. The arrangement of these units will be described below.

The RDF 41 includes an original tray 41a, original feed rollers 41b, transfer rollers 41c, a conveyor belt 41d, eccentric cams 41e to 41g, transfer rollers 41h, original discharge rollers 41i and original discharge tray 41e. The original is fed and transferred through paper paths Ia to Ie.

The image reading unit 42 has a platen 42a. The original 31 placed on the platen 42a is scanned by a scanning system (not shown), and the image signal is processed by the CPU 18.

The image forming unit 43 includes registration rollers 43a, a laser 43b, a scanner 43c, an optical lens 43d, a scanning mirror 43e, a photosensitive drum 43f, a conveyor belt 43g, a fixer 43h, an eccentric cam 43i, and delivery rollers 43j.

The two-side unit 44 includes an intermediate tray 44a, transfer rollers 44b, a paper feed roller 44c, and transfer rollers 44d. The sheet is fed and transferred along paper paths Va to Vd.

The paper cassette/deck unit 45 includes paper cassettes 45a and 45b and a paper deck 45c. The paper deck 45c receives the recording sheets through the paper path Vd of the two-side unit 44.

The paper delivery unit 46 includes delivery rollers 46a, a sorter 46b and delivery bins 46c. The delivery bins 46c of the sorter 46b are selectively driven by a driving means (not shown) in response to a signal from the control in the image reading unit 42, allowing placement of the delivered sheets in the proper order.

Figures 1B, 10:
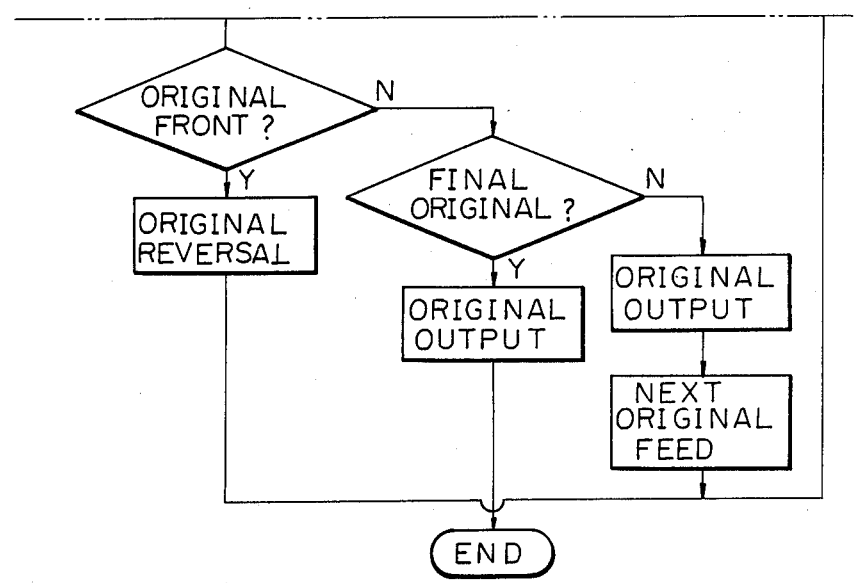

The operation of the copying machine having the arrangement described above will be described below. FIGS. 10-1(a) and 10-1(b) represent a flow chart for explaining this operation. When an original is fed to the exposure position, the presence or absence of an image is determined. If an image is present, the control outputs a copy start instruction. Otherwise, this instruction is not output, and the original is reversed or delivered.

The originals 31, consisting of one- and two-sided originals, are placed on the original tray 41a with their first surfaces facing up. In this state, when the operator depresses a copy key in an operation unit (not shown) on the image reading unit (to be referred to as a reader hereinafter) 42, the original feed rollers 41b in the RDF 41 are rotated, and the original feed rollers 41b in the original tray 41a are rotated, so that the uppermost one of the originals 31 on the tray 41a is fed out. The original 31 passes from the path Ia to the path Ib by means of transfer rollers 41c and is transferred onto the platen 42a by the conveyor belt 41d. The original 31 is timed to stop at a proper position on the platen 42a in response to a timing signal from a timing pulse generator (not shown) synchronized with paper sensors (not shown) arranged in the paper paths and a roller drive system, as is known to those skilled in the art. When the original 31 stops on the platen 42a, the first page of the original 31 faces down. The reader 42 starts scanning the original, as previously described. Upon scanning, the image determining means 2b in the reader 42 determines the presence or absence of an image on the original. For example, if the original 31 has an image on its first page, the reader 42 determines that an "image is present" and supplies a copy start instruction to the image forming unit (to be referred to as a printer hereinafter) 43. At the same time, the reader 42 starts rescanning of the original to output an image signal. A recording sheet with a size specified by the reader 42 is fed from the paper cassette 45a or 45b or the paper deck 45c. The sheet is fed to the registration rollers 34a and is stopped. The registration rollers 43a are rotated again to feed the sheet in response to an image leading end signal from the reader from 42. A transfer timing between the feed sheet and the toner image formed on the photosensitive drum 43f is matched, and the toner image can be transferred onto the sheet. Subsequently, the sheet with the toner image passes along the conveyor belt 43g, and the image is fixed on the sheet by thermal compression of the fixer 43h. The sheet is transferred from the fixer 43h in the direction of the paper path Va of the two-side unit 44 by the eccentric cam 43i so as to form an image on the other side of the sheet. The sheet passes through the transfer rollers 44b along the paper path Vb and is placed on the intermediate tray 44a. At this point, the copied surface of the sheet faces up. During sheet transfer to the intermediate tray 44a, e.g., when the sheet has just passed through the fixer 43h, the printer 43 supplies a "second page copy enable" signal to the reader 42. Upon reception of this signal, the reader 42 outputs an "original reversal" instruction to transfer the original 31 (the first side facing downward) onto the platen 42a in the upper left direction. The original 31 is passed along the paper path Id by the eccentric cams 41e and 41f and is temporarily stopped by the transfer rollers 41h just after it has passed the eccentric cam 41f. Thereafter, the transfer rollers 41h are rotated in a direction opposite to the previous rotational direction. At the same time, the eccentric cams 41f and 41g are set to direct the original 31 toward the paper path Ie. The original 31 is transferred by the transfer rollers 41h and the eccentric cams 41f and 41g along the paper path Ie. When the original 31 has just passed the transfer rollers 41c, the transfer rollers 41c stop and begin to rotate in the opposite direction. At the same time, the eccentric cams 41e and 41g cause the original 31 to pass along the paper path Ic. The original 31 is stopped on the platen 42a with its first side facing up by means of the conveyor belt 41d. The reader 42 starts scanning the original and checks for the presence or absence of an image on the original 31. It has not been determined if any image is present on the second side of the original. If an "image is present", the reader 43 supplies a copy start instruction to the printer 43 and starts rescanning of the original to output an image signal, as previously described. However, if no image is present on the second side of the first original 31, the reader 42 need not output a copy start instruction. Instead, the reader 42 immediately supplies a sheet feed instruction for the second original 31 to the RDF 41. The RDF 41 performs the same sequence as for original reversal. In other words, the original passes along the paper path Id, is transferred along the paper path Ie, and is delivered to the original delivery tray 41e. Thus the first side of the original 31 faces down. At the same time, the second original 31 on the original tray 41a is fed onto the platen 42a. When the second original 31 stops on the platen 42a, the reader 42 starts scanning the original 31 to determine if an image is present. If the reader 42 determines that an "image is present", the reader 42 supplies a copy start instruction to the printer 43 and starts rescanning the original to output the image signal. However, if the reader 42 determines that "no image is present", the reader 42 supplies a "reversal instruction" of the original 31 to the RDF 41.

If the second side of the first original 31 or the first side of the second original 31 (i.e., the third side of the originals 31) contains an image, the reader 42 supplies a copy instruction for the second surface of the sheet to the printer 43. Upon reception of the copy instruction, a paper feed instruction for the intermediate tray 44a is supplied from the printer 43 to the two-side unit 44. The feed roller 44c of the intermediate tray 44a feeds the sheet. The sheet passes along the paper paths Vc and Vd and is stopped at the position of the registration rollers 43a. Subsequently, the registration rollers 43a are rotated, and a toner image is transferred to the second side of the first sheet. The sheet with the toner image is transferred to the conveyor belt 43g and the fixer 43h. The toner image is fixed by the fixer 43h and is sent by the eccentric cam 43i in the direction of the delivery rollers 43j. The sheet passing through the delivery rollers 43j is exhausted by the delivery rollers 46a into a corresponding one of the delivery bins 46c of the sorter 46b. At this point, the first page of the sheet faces down. The originals 31 stacked on the original tray 41a in the RDF 41 are sequentially processed, thereby obtaining a set of consecutively ordered copies. When the sorter 46b is used, the necessary number of two-sided copies of one original are delivered on the delivery bins 46c, and then copying for the next two-sided original is started.

In the above embodiment, determination of an image presence or absence is performed immediately prior to copying. However, it may be performed in advance, and the determination result can be stored in a memory.

During copying, the determination result is read out from the memory to feed the originals. This operation will be described with reference to the following embodiment.

Figure 8:
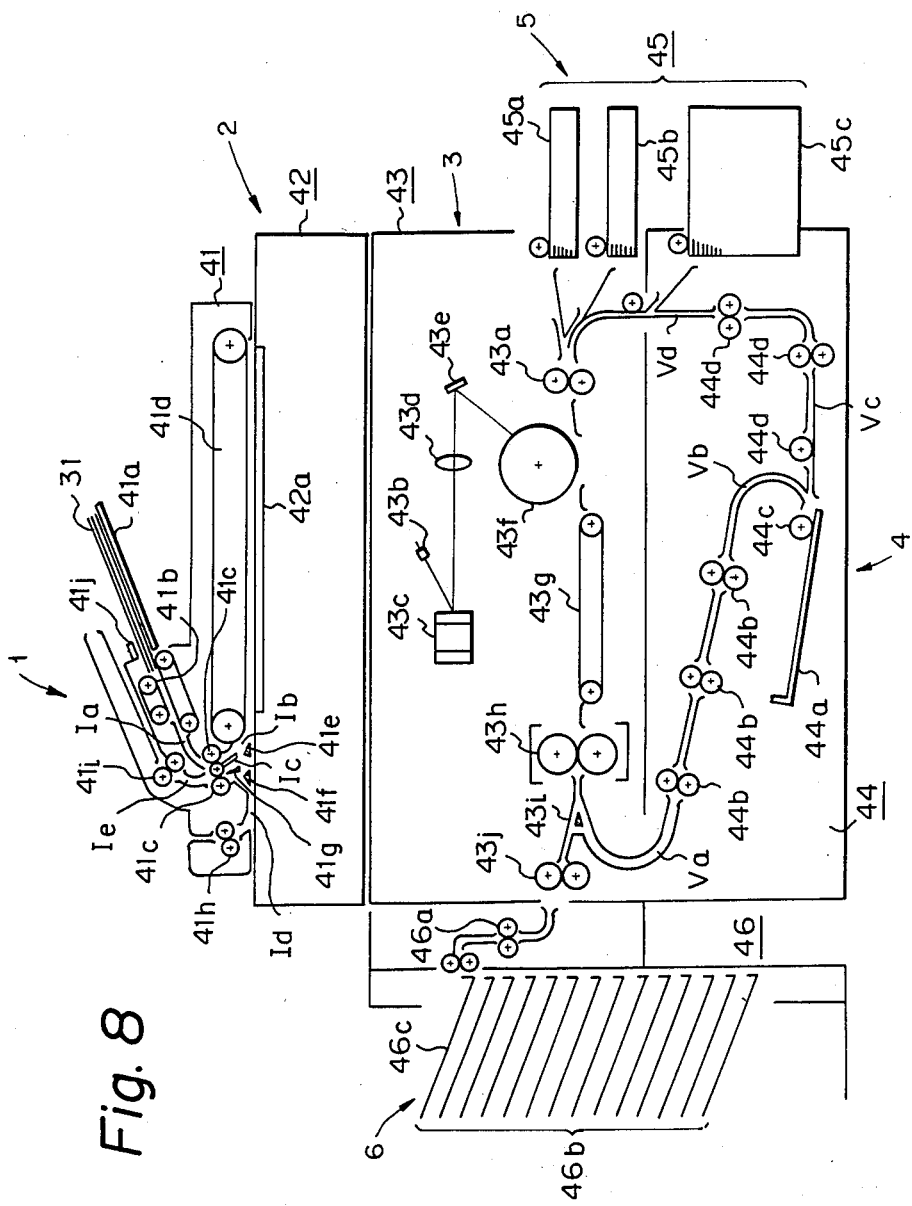

FIG. 8 is a sectional view of a two-sided copying machine according to another embodiment of the present invention. The same reference numerals in FIG. 8 denote the same parts as in FIG. 7. Reference numeral 41j denotes a partition plate for detecting one circulation cycle of the original. FIGS. 10-2(a), 10-2(b) and 10-3(a), 10-3(b) are flow charts for explaining the above operation. In this embodiment, an original delivered from the exposure position returns to an original tray 41a.

FIGS. 9(a) and 9(b) are representations for explaining original stacking states and page ordering of the copied sheets. Referring to FIGS. 9(a) and 9(b), "EX" means that an image is present, and "NON" means that no image is present. Numbers in FIGS. 9(a) and 9(b) represent page number of originals.

The operation of the copying machine of this embodiment will be described with reference to FIGS. 8, 9(a) and 9(b).

Figures 2B, 10:
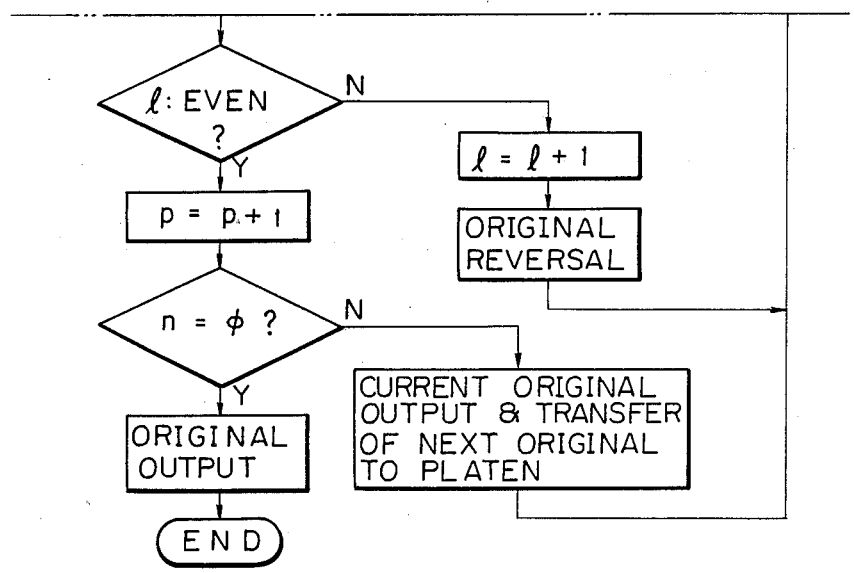
Figures 3B, 10:
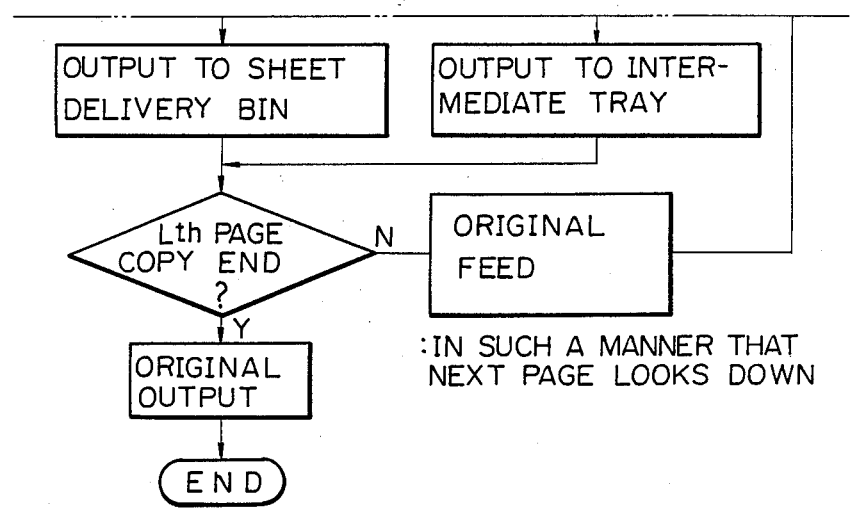

The following description is represented by the flowchart in FIGS. 10-2(a) and 10-2(b) and describes the determination of an image presence or absence in advance of the copying. The results of this determination are stored in a memory and read during the copying process. This process is represented by the flowchart in FIGS. 10-3(a) and 10-3(b) and is also described in detail hereinafter.

As shown in FIG. 9(a), one- and two-sided originals are mixed and stacked on an original tray 41a, with the first surfaces (i.e., the first sides of the respective originals) facing up. In this state, when the operator depresses a copy key in an operation unit (not shown) in an image reader 42, original feed rollers 41b of an RDF 41 are rotated, and the original feed rollers 41b in the original tray 41a are rotated to feed the lowermost original 31 stacked on the tray 41a, i.e., 9th and 10th pages (the 10th page facing down). The original 31 passes through transfer rollers 41c along paper paths Ia and Ib by means of eccentric cam 41k and is transferred onto a platen 42a by a conveyor belt 41d. The original 31 is timed to stop accurately on the platen 42a in response to a timing signal from a timing pulse generator (not shown) synchronized with paper sensors (not shown) arranged in the respective paper paths and a roller drive system in a known manner. When the original is stopped on the platen 42a (the 9th page facing down), the reader 42 starts scanning the original. An image determining means 2b arranged in the reader 42 determines the presence or absence of an image. Since the 9th page contains an image, the reader 42 determines that the upper surface of the Nth original has the image, and a determination result is stored in the working memory. At the same time, the reader 42 supplies an "original reversal" instruction to an RDF 41. In response to this instruction, the RDF 41 causes a conveyor belt 41d to transfer the original 31 (the 9th page facing down) from the platen 42a to the left. The original 31 passes along a paper path Id by means of eccentric cams 41e and 41f. The original 31 is then stopped by transfer rollers 41h when the original 31 has just passed the eccentric cam 41f. Thereafter, the transfer rollers 41h are rotated in the opposite direction, and the eccentric cams 41f and 41g are set to direct the original 31 toward a paper path Ie. The original 31 is transferred through the paper path Ie by the transfer rollers 41h and the eccentric cams 41f and 41g. When the original 31 has just passed the transfer rollers 41c, the transfer rollers 41c are stopped. The transfer rollers 41c are rotated in the opposite direction, and the eccentric cams 41e, 41g and 41k cause the original 31 to pass through a paper path Ic. The original 31 is stopped by the conveyor belt 41d on the platen 42a. In this state, the 9th page faces up. The reader 42 starts scanning the original and determines if an image is present on the 10th page. Since an image is present on the 10th page, the reader 42 sets in the working memory information representing that the lower surface of the Nth original 31 has an image thereon. The image determining means 2b completes the image presence or absence determination. At the same time, the reader 42 supplies an "original delivery" instruction to the RDF 41. In response to this instruction, the RDF 41 causes the conveyor belt 41d to transfer the original (the 9th page facing up) from the platen 42a to the left. In the same manner as in the "original reversal" sequence described above, the original 31 is temporarily stopped when it has just passed the eccentric cam 41f. Unlike in the "original reversal" sequence, the original is not stopped while it is passing through the paper path Ie. The original 31 is discharged to an original tray 41a. In this state, the 9th page of the original 31 faces down, and this original is separated by a partition plate 41j from the originals 31 left on the original tray 41a. Subsequently, a sequence of original feed, original reversal, image presence or absence determination, and original delivery is repeated. When image presence or absence determination of the five originals 31 placed on the original tray 41a is completed, the two-sided copy sequence is started.

The image determining means 2b in the reader 42 determines to perform copying according to the page sequence shown in FIG. 9(b). A transfer control 2c supplies control instructions to the RDF 41, a printer 43 and a two-side unit 44 in accordance with the page sequence. More specifically, the reader 42 supplies an "original feed" instruction to the RDF 41. The RDF 41 detects the circulation cycle of the originals and temporarily releases the partition plate 41j. The partition plate 41j is located on the originals 31. In other words, the state in FIG. 8 is restored. In this case, the order of originals 31 is given such that the final page is located at the lowermost position, as shown in FIG. 9(a). The reader 42 receives the "original feed" instruction, and the lowermost original, i.e., the 9th and 10th pages of FIG. 9(a), is fed onto the platen 42a. In this case, the 9th page of the original 31 faces down. Since the reader 42 determines the image on the 10th page must be copied first according to the image determination, it supplies an "original reversal" instruction to the RDF 41. The RDF 41 performs reversal operation of the original 31 according to the page sequence described above. The reader 42 supplies a "one-side copy" instruction to the printer 43 and starts scanning the original to output an image signal.

Upon reception of the copy start instruction from the reader 42, the printer 43 starts feeding paper from paper cassette 45a or 45b or a paper deck 45c which stores sheets of a size specificed by the reader 42. The sheet is fed to the position at registration rollers 43a and is then stopped thereat. The registration rollers 43a are rotated again in response to the image leading end signal from the reader 42, thereby transferring the sheet, so that the sheet is timed with the toner image on the photosensitive drum 43f. The sheet containing a toner image is conveyed by a conveyor belt 43g to a fixer 43h. The toner image is fixed on the sheet by thermal compression. The fact that the lower surface of the sheet from the fixer 43h need not be subjected to copying is apparent from the page sequence. The sheet is directed by an eccentric cam 43i toward delivery rollers 43j. The sheet delivered by the delivery rollers 43j is placed by tranfer rollers 46a on a corresponding one of delivery bins 46c in a sorter 46b. In this case, the 10th page of the original 31 faces up, as shown in FIG. 9(a). During sheet delivery, the printer 43 sends a "next sheet copy enable" signal to the reader 42. In response to this signal, the reader 42 determines that the next page to be copied is the 9th page, the reader 42 supplies an "original reversal" instruction to the RDF 41 and the original is reversed by the sequence described above. When the original is reversed, the reader 42 supplies a "two-side copy start" instruction to the printer 43 and starts scanning the original to output an image signal. The printer 43 performs copying of the 9th page in the same sequence as described above. In response to the "two-side copy" instruction from the reader 42, the sheet having the copied 9th page is directed by the eccentric cam 43i toward the paper path Va after the sheet passes the fixer 43h. The sheet passes the paper path Vb by the transfer rollers 44b and is placed on the intermediate tray 44a. In this case, the sheet surface with the image, i.e., the 9th page of the original 31 faces up. During sheet transfer to the intermediate tray 44a, e.g., when the sheet has just passed the fixer 43h, the printer 43 supplies a "lower surface copy enable" signal to the reader 42. Upon reception of this signal, the reader 42 determines that the next page to be copied is the seventh page of the original 31 according to the page sequence. The original 31 is delivered by eccentric cams 41e and 41g from the platen 42a to the original tray 41a through the paper paths Ic and Ie. At the same time, the next original 31, i.e., the original 31 located at the lowermost position of the original tray 41a is fed onto the platen 42a. In this state, the 7th page of the original 31 faces down, so that the reader 42 outputs a copy start instruction to the printer 43 so as to copy the sheet from an intermediate tray 44a. The sheet fed from the intermediate tray 44a passes by transfer rollers 44d through the paper paths Vc and Vd and is transferred to the position at the registration rollers 43a. The sheet is temporarily stopped at this position. The same sequence as described above is repeated, and the sheet is delivered on a corresponding one of the delivery bins 46c in the sorter 46b. In this case, the sheets on the bins 46c are placed such that the 10th and seventh pages face up.

In the same manner as described above, the originals 31 on the original tray 41a in the RDF 41 are sequentially processed from the lowermost original, and thus two-sided copies without page omissions can be obtained. When the sorter 46b is used, a desired number of sets of copies are sorted on the delivery bins 46c. Thereafter, the next copying sequence is started.

In the above embodiment, the RDF 41 independently controls the feed and delivery of the originals 31. However, paper feed and its delivery can be simultaneously performed. In the above embodiment, the entire surface of the original 31 is scanned to determine the presence or absence of an image. However, when the presence of an image is detected during scanning of the original 31, original scanning can be interrupted and the subsequent step may be executed.

The above embodiments exemplify image formation by the electrophotographic process. However, the present invention is not limited to the above process, but can be extended to image formation by inkjet printing, thermal transfer printing or the like.

The above embodiments exemplify an arrangement wherein an original on the platen is scanned to determine the presence or absence of an image on the original. However, a plurality of photosensors may be arranged in the feed direction and a direction perpendicular thereto to detect the image density of the original in synchronism with the original feeding operation. The presence or absence of an image thus can be detected according to the detected image density.

The above embodiments exemplify digital copying machines. However, the present invention can also be applied to analog copying machines.

The above embodiments exemplify a two-sided copying machine. However, the present invention can also be applied to one side copying machines.

What is claimed is:

1. An image processing apparatus comprising:
    determining means for determining the presence or absence of an image on an original; and
    processing means for performing image processing according to a determination result of said determining means;
    wherein said processing means comprises convey means for feeding the original to an exposure position and for removing the original from the exposure position, and control means for controlling the original-removing operation of the convey means according to the determination result; and
    wherein said determining means determines the presence or absence of an image on the original while the original is located at the exposure position.

2. An apparatus according to claim 1, wherein said control means causes the convey means to leave the original at the exposure position when the determination result indicates the presence of an image and causes the convey means to remove the original from the exposure position when the determination result indicates the absence of an image.

3. An image forming apparatus comprising:
    convey means for feeding an original having two sides to an exposure postion and for removing the original from the exposure position;
    image forming means for forming an image on a recording medium according to an image on the original while the original is located at the exposure position;
    determining means for determining the presence or absence of an image on the original; and
    control means for controlling said convey means according to a determination result of said determining means;
    wherein said determining means determines the presence or absence of an image on the original while the original is located at the exposure position.

4. An apparatus according to claim 3, wherein said image forming means comprises photoelectric conversion means for optically converting the image on the original into an electrical signal, and wherein said determining means also comprises said photoelectric conversion means and determines the presence or absence of an image on the original in response to the electrical signal produced by said photoelectric conversion means.

5. An apparatus according to claim 4, wherein said image forming means forms the image on the recording medium in response to the electrical signal produced by photoelectric conversion means.

6. An apparatus according to claim 3, wherein said determining means determines the presence or absence of an image on the original each time an original is fed by said convey means to the exposure position.

7. An apparatus according to claim 3, wherein said determining means determines the presence or absence of an image on each of a plurality of originals prior to operation of said image forming means.

8. An apparatus according to claim 7, wherein said convey means comprises means for supporting a plurality of originals, feeding means for feeding an original from said supporting means to the exposure position, and removing means for removing the original from the exposure position and delivering it to the supporting means.

9. An apparatus according to claim 8, wherein prior to the operation of said image forming means, said convey means sequentially feeds each of the plurality of originals from said supporting means to the exposure position, removes each of the originals from the exposure position, and delivers each of the originals to said supporting means, with said determining means determining the presence or absence of an image on each of the originals while it is located at the exposure position.

10. An apparatus according to claim 3, wherein said convey means comprises reversing means for reversing the orientation of an original located at the exposure position and wherein said reversing means reverses the orientation of the original located at the exposure position after said determining means determines the presence or absence of an image on a first side of the original so as to enable said determining means to determine the presence or absence of an image on a second side of the original.

11. An apparatus according to claim 3, wherein said image forming means forms images on both sides of the recording medium.

12. An image forming apparatus comprising:
determining means for determining the presence or absence of an image on each side of a plurality of two-sided originals; and
image forming means for forming images on a plurality of two-sided recording media such that an image is formed on both sides of each of said plurality of recording media, with the possible exception that no image is formed on the last side of the last recording medium, according to determination results of said determining means;
wherein said image forming means comprises convey means for feeding an original to an exposure position and for removing the original from the exposure position, and control means for controlling the original-removing operation of the convey means according to a determination result of said determining means; and
wherein said convey means comprises reversing means for reversing the orientation of an original located at the exposure position and wherein said reversing means reverses the orientation of the original located at the exposure position after said determining means determines the presence or absence of an image on a first side of the original so as to enable said determining means to determine the presence or absence of an image on a second side of the original.

13. An image processing apparatus comprising:
processing means including reading means for reading an image on an original, said processing means performing a predetermined processing operation for the original based on a signal output from said reading means:
discriminating means for discriminating the presence or absence of an image on the original based on the signal output from said reading means; and
control means for controlling the operation of said processing means in accordance with a discrimination result of said discriminating means, wherein when said discrimination result indicates the presence of an image on the original said control means controls said processing means to carry out the predetermined processing operation for the original, and when said discrimination result indicates the absence of an image on the original, said control means prohibits said processing means from carrying out the predetermined processing operation for the original.

14. An apparatus according to claim 13, wherein said predetermined processing operation for the original comprises forming an image of the original on a recording medium based on the signal output from said reading means.

15. An apparatus according to claim 13, wherein said discriminating means discriminates the presence or absence of an image on the original based on a signal output from said reading means while the original is located at a reading position.

16. An apparatus according to claim 15, wherein when said discrimination result indicates the presence of an image on the original, said control means controls said processing means so as to cause said reading means to re-read the image on the original as part of said predetermined processing operation for the original.

17. An image processing apparatus comprising:
processing means for sequentially reading a plurality of originals and for performing a predetermined processing operation based on image data obtained by sequentially reading images on the originals;
storage means for storing data indicating the presence or absence of an image on each of the originals before said processing means reads the images on the originals to obtain the image data; and
control means for determining whether said processing means is to read each original in obtaining the image data based on the data stored in said storage means, and for controlling said processing means in accordance with a determination result of said control means.

18. An apparatus according to claim 17, wherein said processing means includes convey means for sequentially feeding the originals to a reading position and removing them from the reading position after they have been read.

19. An apparatus according to claim 18, wherein before said processing means reads the images on the originals to obtain the image data, said control means controls said processing means so as to cause said convey means to sequentially feed the originals to said reading position and to cause said processing means to read the originals to obtain preliminary data, and wherein said control means discriminates the presence or absence of an image on each of the originals based on the preliminary data and controls said storage means to store data indicating the presence or absence of an image on each of the originals determined in accordance with discrimination results of said control means.

* * * * *

UNITED STATES PATENT AND TRADEMARK OFFICE
CERTIFICATE OF CORRECTION

PATENT NO. : 4,839,740
DATED : June 13, 1989
INVENTOR(S) : EIICHI YOSHIDA

It is certified that error appears in the above-identified patent and that said Letters Patent is hereby corrected as shown below:

COLUMN 1

Line 21, "into" should read --onto--.

COLUMN 2

Line 47, "determinating" should read --determining--.

COLUMN 4

Line 36, "signals" should read --signal--.

COLUMN 5

Line 38, "determinating" should read --determining--.

COLUMN 7

Line 41, "registration rollers 34a" should read --registration rollers 43a--.

COLUMN 8

Line 14, "the original." should read --the first original.--.

UNITED STATES PATENT AND TRADEMARK OFFICE
CERTIFICATE OF CORRECTION

PATENT NO. : 4,839,740
DATED : June 13, 1989
INVENTOR(S) : EIICHI YOSHIDA

It is certified that error appears in the above-identified patent and that said Letters Patent is hereby corrected as shown below:

COLUMN 13

Line 4, "photoelectric conversion means." should read
　　　　　--said photoelectric conversion means.--.
　　　Line 31, "position" should read --position,--.
　　　Line 60, "position" should read --position,--.

COLUMN 14

Line 12, "original" should read --original,--.

Signed and Sealed this

Nineteenth Day of February, 1991

*Attest:*

HARRY F. MANBECK, JR.

*Attesting Officer*　　　*Commissioner of Patents and Trademarks*